United States Patent [19]

Pasch et al.

[11] 4,222,732
[45] Sep. 16, 1980

[54] TRANSFER MOLDING INSULATION UNIT

[75] Inventors: Lambert M. Pasch, Aachen-Nutheim; Heinz Wagemann, Aachen, both of Fed. Rep. of Germany

[73] Assignee: Uniroyal Aktiengesellschaft, Aachen, Fed. Rep. of Germany

[21] Appl. No.: 957,638

[22] Filed: Nov. 3, 1978

Related U.S. Application Data

[63] Continuation of Ser. No. 554,279, Feb. 28, 1975, abandoned.

[30] Foreign Application Priority Data

Apr. 29, 1974 [DE] Fed. Rep. of Germany ....... 2420723
Apr. 29, 1974 [DE] Fed. Rep. of Germany ....... 2420724

[51] Int. Cl.$^3$ ............................................. B29F 1/06
[52] U.S. Cl. ........................... 425/544; 425/DIG. 228
[58] Field of Search ...................... 425/544, DIG. 228

[56] References Cited

U.S. PATENT DOCUMENTS

| 3,859,023 | 1/1975 | Pasch | 425/DIG. 228 |
| 3,918,870 | 11/1975 | Tetzlaff | 425/DIG. 228 |

*Primary Examiner*—Thomas P. Pavelko
*Attorney, Agent, or Firm*—Norbert P. Holler

[57] ABSTRACT

An apertured insulation unit is disclosed for interposition between a mold having at least one cavity in which elastomeric stock can be cured in the form of said cavity and an injection unit from which elastomeric stock can be expelled and transferred through the insulation unit to the mold cavity, the mold and injection unit being movable axially relative to one another into and out of pressing association with respective opposite side-faces of the insulation unit. The insulation unit serves to prevent curing of elastomeric stock remaining in the injection unit with the curing of the portion of such stock transferred to the cavity, without separation of either the mold or the injection unit from the insulation unit. The insulation unit is at least in part in the form of a thin, flexible, apertured plate constituted of a thermal-insulatory material which is engageable and forms a parting line with the mold.

25 Claims, 5 Drawing Figures

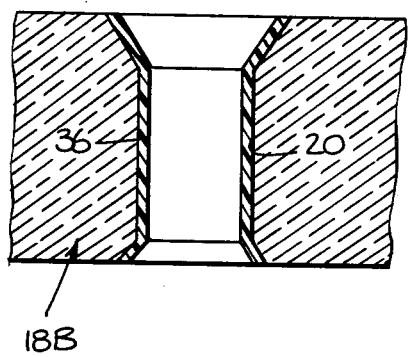
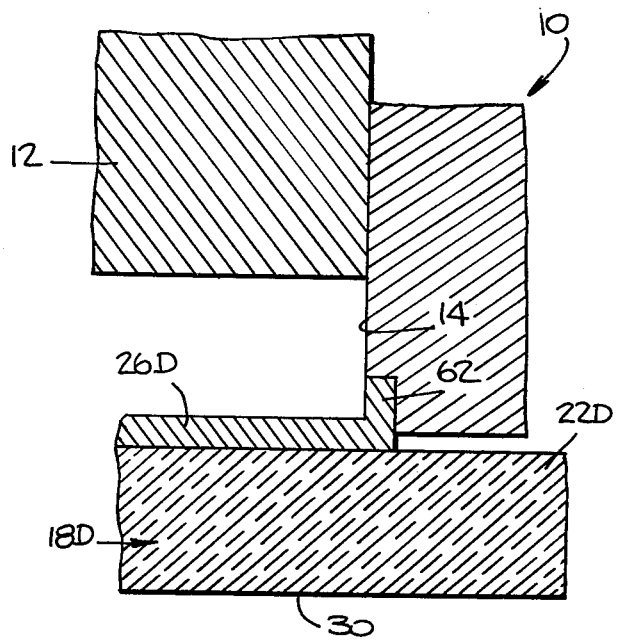
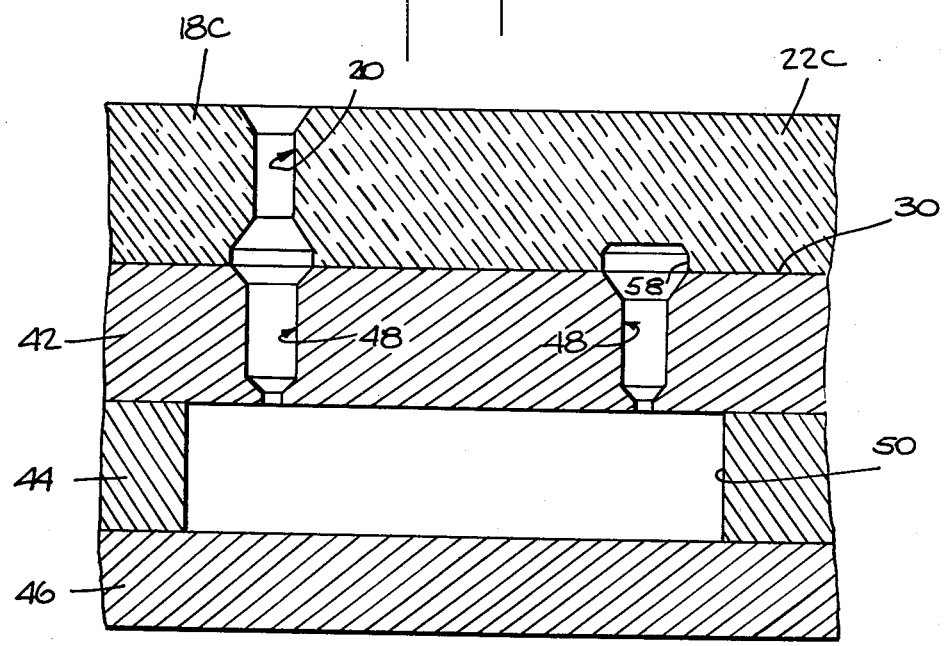

TRANSFER MOLDING INSULATION UNIT

This is a continuation, of application Ser. No. 554,279, filed Feb. 28, 1975 now abandoned.

BACKGROUND OF THE INVENTION

The present invention relates generally to the fields of transfer, injection and compression molding, and more particularly to the construction and physical characteristics of an insulation unit for interposition between a mold and an injection unit from which elastomeric stock can be expelled and transferred through the insulation unit to the mold. The term "injection unit" as used herein shall be understood to embrace injection and transfer assemblies alike as conventionally used in the art.

In particular, the present invention is an improvement over the insulation unit described and disclosed in United States Patent Application Ser. No. 316,165, filed on Dec. 18, 1972 now U.S. Pat. No. 3,859,024, issued Jan. 7, 1975, the subject matter of which is hereby incorporated by reference herein.

A number of difficulties have arisen with respect to the use of such an insulation unit. For example, when such an insulation unit is utilized in an environment in which there is employed a "bottomless" cylinder (a cylinder having an open end communicating directly with the insulation unit), upon retraction of the piston of the cylinder away from the insulation unit the elastomeric stock or compound interposed between the piston and the insulation unit tends to adhere to the insulation unit causing the latter to buckle at least slightly and crack eventually in the region of each of the sprue-communicating apertures formed in the insulation unit. It is, therefore, possible for the insulation unit to deteriorate more rapidly than necessary.

Another example of a difficulty associated with the use of such an insulation unit on a "bottomless" cylinder, and for that matter on a conventional "bottomed" transfer cylinder or pot (a cylinder or pot having a closed, multi-apertured, end upon which is superposed such as insulation unit), relates to the presence of undesirable constrictions at the interface of the insulation unit and mold, between the mold sprues and the insulation unit apertures. Such constrictions are presented when the mold sprues are not precisely coaxially aligned with their corresponding apertures formed in the insulation unit.

For example, after a given curing cycle, a mold operator removes the mold assembly from the region of the injection unit and empties the mold sprues and cavities. Since each of the mold sprues is extremely narrow in cross-section, it is difficult to restore the mold opposite the injection unit such that the mold sprues are in precise coaxial alignment with their corresponding apertures in the insulation unit. Failure to precisely re-align the mold sprues and insulation unit apertures results in the formation of constrictions at least partially blocking the mold sprues, respectively, and preventing the mold cavities from being effectively filled.

Still a further difficulty associated with the use of such an insulation unit involves the need, and heretofore inability, to effectively discharge or vent from the mold cavities undesirable gases collected in each of the mold cavities during the period in which they are filled with air or gas-pocketed elastomeric stock, and during the period in which the elastomeric stock cures and releases the gases in the mold cavities.

SUMMARY OF THE INVENTION

Accordingly, it is an object of the present invention to provide an insulation unit which is capable of resisting buckling and cracking when subjected to forces generated by a retracting piston pulling against uncured, adhesive-acting, elastomeric stock disposed between it (the insulation unit) and the retracting piston, and thereby against the insulation unit.

A further object of the present invention is to provide an insulation unit formed with apertures having a preferred cross-sectional configuration necessary to ensure an unobstructed communication between the mold sprues and corresponding ones of the apertures formed in the insulation unit.

It is still a further object of the present invention to provide a system for effecting the evacuation of undesirable gases collected in the mold cavities during the period in which the latter are filled with elastomeric stock, and during the period in which such elastomeric stock cures in the cavities.

Accordingly, the present invention relates to an apertured insulation unit for interposition between a mold having at least one cavity in which elastomeric stock can be cured in the form of the cavity and an injection unit from which elastomeric stock can be expelled and transferred through the insulation unit to the cavity of the mold, the mold and injection unit being movable axially relative one another into and out of pressing association with respective opposite side-faces of the insulation unit. The insulation unit serves to prevent curing of elastomeric stock remaining in the injection unit with the curing of a portion of the stock transferred to the cavity, without separation from the insulation unit of the mold or injection unit.

The insulation unit in one embodiment thereof comprises a first apertured plate constituted of a flexible thermal-insulatory material and a second apertured plate superposed upon and affixed to the first plate, the second plate being constituted of a different flexible material having a greater tensile strength and a lower capacity to resist heat-transfer than the first plate, the second plate, thus, constituting means for reinforcing the first plate against buckling and deterioration.

In a second embodiment of the present invention, the insulation unit is in the form of a thermal-insulatory plate having apertures through which elastomeric stock is transferable, the apertures being at least partially tapered and each presenting a divergent portion having a maximum diameter at the side-face thereof against which presses the mold. For purposes of compensating for misalignment of the apertures of the insulatory plate with corresponding sprue-constituting apertures of a top mold plate of the mold, the maximum diameter of the apertures of the insulation plate is preferably greater than the maximum diameter of the sprue-constituting apertures of the top mold plate.

In still a third embodiment of the present invention, the insulatory plate is formed with a plurality of apertures through which elastomeric stock is transferable, and also with a plurality of blind recesses on the surface thereof against which presses the top mold plate of the mold. Each blind recess cooperates with a corresponding aperture formed in the top mold plate to communicate with a given mold cavity with which also communicates a second aperture of the top mold plate. In other words, each and every mold cavity is associated with a pair of sprue-constituting apertures in the top mold plate, one of the sprue-constituting apertures of each pair communicating directly with a corresponding blind recess formed in the insulation unit, the other aperture of each pair intercommunicating the injection unit chamber with a given mold cavity. Each blind recess and the sprue-constituting aperture communicating therewith together constitute vent means according to the present invention for directing the outflow of gases collected in their corresponding mold cavity during the period in which the cavity is filled with elastomeric stock and while the latter cures and releases pocket-entrapped gases thereinto.

BRIEF DESCRIPTION OF THE DRAWINGS

While the specification concludes with claims particularly pointing out and distinctly claiming the subject matter regarded as the invention herein, it is believed that the invention will be better understood from the following description taken in conjunction with the accompanying drawings, in which:

FIG. 3 is a schematic, fragmentary, cross-sectional view of still a further form of the embodiment of the insulation unit illustrated in FIG. 1;

FIG. 4 is a schematic, fragmentary, cross-sectional view of a mold and insulation unit pursuant to the principles of a second embodiment of the present invention; and FIG. 5 is a schematic, fragmentary, cross-sectional view of an injection or transfer unit in association with still a third embodiment of the insulation unit of the present invention.

DETAILED DESCRIPTION OF THE INVENTION

Figure 1:
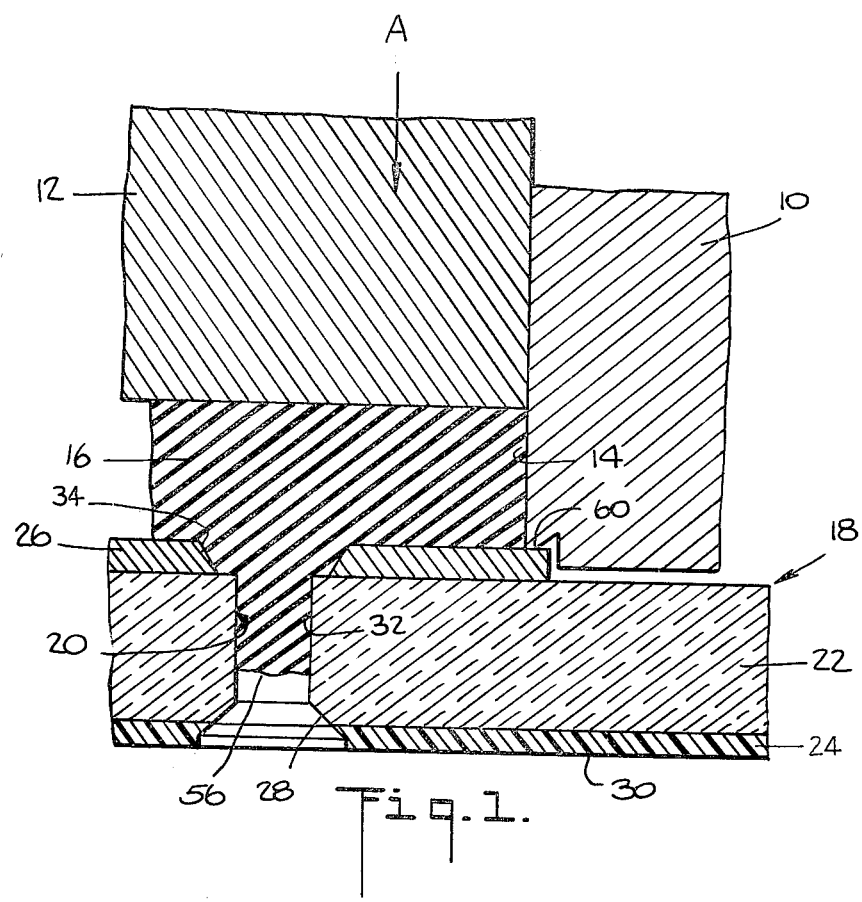
FIG. 1 is a schematic, fragmentary, cross-sectional view illustrating an injection or transfer unit in association with one embodiment of the insulation plate pursuant to the present invention.

Referring now to the drawings, and more particularly to FIG. 1, there is illustrated a fragment of an injection or transfer unit 10 in which is axially movable, in the direction of arrow A, a piston 12. The unit 10, in the form illustrated, is of the "bottomless" cylinder variety and, thus, presents an open-ended chamber 14 in which is confined elastomeric stock or similar rubber-like compound 16.

Pursuant to the present invention, there is provided an insulation unit generally denoted by the reference character 18, the insulation unit 18 communicating directly with the open-ended chamber 14 of the injection unit 10. The insulation unit 18 is provided with at least one aperture 20 through which the elastomeric stock 16, confined in the chamber 14, may be expelled and transferred in the direction of arrow A into a corresponding mold cavity separated from the injection unit 10 by the insulation unit 18. The specific relationship of the insulation unit 18 with a mold will be described below.

The insulation unit 18 comprises a flexible, thermal-insulatory plate 22 constituted preferably of a mixture of asbestos fibers and a thermo-setting resin, such as a phenol resin or the like. It is preferable that the thermal conductivity of the plate 22 be in the range of approximately 0.05 kcal./m./hr./° K to 0.5 kcal./m./hr./° K. The compression resistance of the plate 22 at temperatures of approximately 180°-200° C. should preferably be in the range of 200-2000 kg./cm.$^2$. The compression resistance rates the capacity of the plate 22 to withstand a specified compression load without undergoing permanent deformation at that compression load. The modulus of elasticity of the plate 22 should preferably be approximately $1.5 \times 10^5$ kg./cm$^2$. It is further preferred that the resin of which the plate 22 is constituted have a thermal conductivity which is in excess of 0.5 watts/m° C.

Superposed along the lower surface of the plate 22 is a liner 24 constituted preferably of a cured asbestosfelt-synthetic resin mixture. The liner 24, for example, may be bonded or otherwise affixed to the plate 22 by means of, for example, vulcanization or the like. Superposed upon the upper surface of the plate 22 is a reinforcing plate 26 which, as will be described with greater specificity below, isolates the plate 22 from the elastomeric stock 16 confined in the chamber 14 of the injection unit 10. The plates 22 and 26 may be vulcanized to eachother.

Pursuant to the principles of a first embodiment of the present invention, each aperture 20 of the insulation unit 18 is formed such that it is at least partially tapered and presents a lower divergent portion 28 having a maximum diameter at the exposed surface 30 of the liner 24 with which is engageable a corresponding mold unit. Preferably, however, each aperture 20 is also formed with a substantially cylindrical transition region 32 and an upper divergent portion 34. The latter divergent portion 34 is presented at least in part in the reinforcing plate 26 in the form of the embodiment illustrated in FIG. 1, or simply in the upper region of the thermal-insulatory plate 22A in the form of the embodiment of the insulation unit 18A illustrated in FIG. 2. In the latter instance, the divergent portion is denoted by the reference character 34A.

Figure 2:
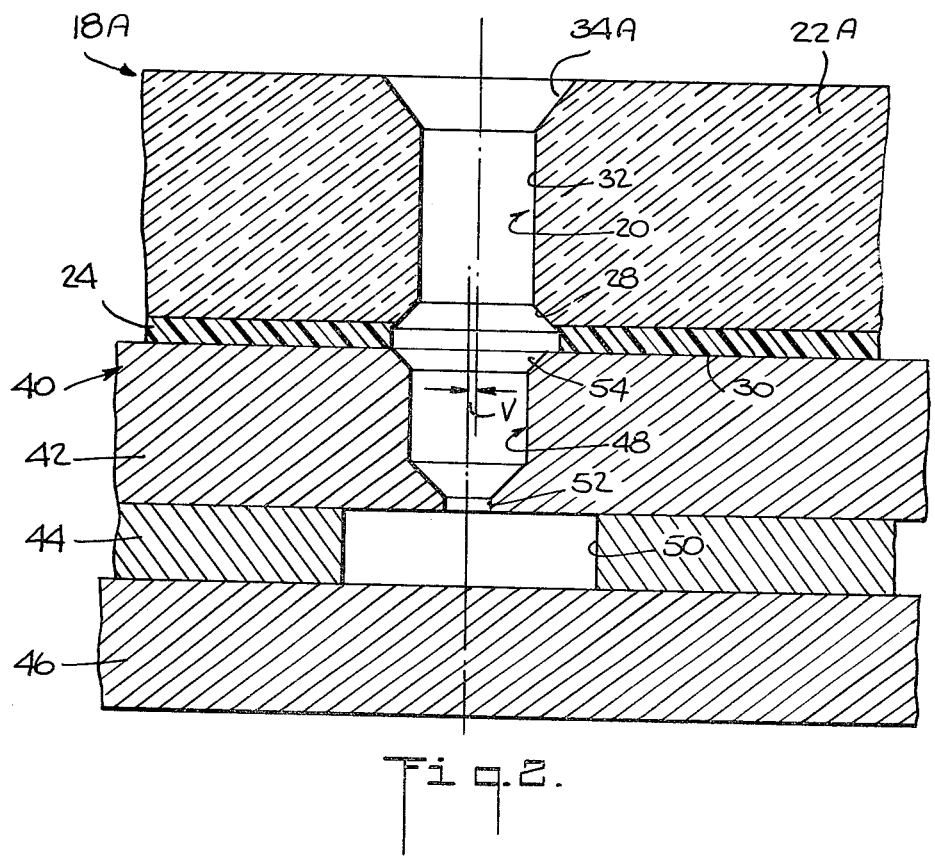
FIG. 2 is a schematic, fragmentary, cross-sectional view illustrating a mold in association with an insulation unit substantially (but not entirely) in accordance with the embodiment of FIG. 1.

It will be understood, that each of the apertures 20 formed in the insulation unit 18, 18A may be in the form illustrated in FIGS. 1 and 2 wherein the material of the thermal-insulatory plate 22, 22A is exposed to and defines a passageway for the elastomeric stock 16 directly. Alternatively, each of the apertures 20 may confine an annular-like, convergent-divergent, Teflon inset contoured to correspond with an associated one of apertures 20 in which it is confined. For reference purposes, such annular-like Teflon insets are denoted by the reference character 36 in FIG. 3. The purpose of the Teflon insets 36 is to reduce the amount of friction associated with the transfer of elastomeric stock 16 through the apertures 20 of the insulation unit 18B.

The functional aspect of the divergent portion 28 of each of the apertures 20 of the insulation unit can be understood with reference to FIG. 2. In this respect, as illustrated in FIG. 2, a mold 40 is engageable with the surface 30 of the liner 24 of the insulation unit 18A. The mold 40 is provided with a top mold plate 42, a cavity-defining plate 44 and a base or support plate 46. The top mold plate 42 is provided with a plurality of sprues 48 (only one is shown) or apertures which define the sprues. Each sprue 48 communicates directly with a corresponding mold cavity 50 and, thereby, intercommunicates each cavity 50 with a corresponding one of the apertures 20 of the insulation unit 18A.

Each sprue 48 is formed with a lower constriction 52 and an upper divergent portion 54 having a maximum diameter preferably no greater than the maximum diameter of the divergent portion 28 of its corresponding aperture 20 in the insulation unit 18. The divergent portion 28 of each aperture 20 cooperates with its corresponding divergent portion 54 of each sprue 48 to compensate for slight misalignment of each sprue 48 with its corresponding aperture 20 when the mold 40 (previously emptied) is restored by an operator into its operative condition opposite the injection unit 10 for a subsequent injection and curing cycle. The misalignment of the respective axes of the apertures 20 and sprues 48 is illustrated in FIG. 2 by the horizontal spacing V. As may be appreciated, such misalignment may be the basis for the formation of a constriction otherwise forming at the interface 30 between the sprues 48 and their corresponding apertures 20, which constriction may hamper proper filling of the mold cavities 50 during an injection cycle.

Because of the provision of the cooperating divergent portions 28 and 54 of the apertures 20 and sprues 48, not only is there effected compensation for misalignment between the respective vertical axes of the sprues 48 and apertures 20, but there is insured that scrap cured in the sprues 48 will without interference sever from the uncured portion of stock medially in the apertures 20 along the jagged line 56 in FIG. 1, and pull cleanly free from the apertures 20. Thus, when the mold 40 is separated from the insulation unit 18A, after a curing cycle, the apertures 20 of the insulation unit 18A are fully cleared of cured elastomeric stock and remain in a readied condition for a further injection cycle free from the need to remove therefrom cured scrap.

With respect to the effectiveness of the cooperating divergent portions 28 and 54 of the apertures 20 and sprues 48, respectively, it has been determined that the maximum diameter of such divergent portions preferably be in the range of approximately 1.2 through 2.0 times greater than the diameter of its corresponding transitional region, for example, the transitional region 32 of each of the apertures 20. Moreover, it is preferred that the depth of such divergent portions 28 and 54 be approximately 1/10th of the thickness of the plate 22 or top mold plate 42, respectively.

Pursuant to the principles of another embodiment of the present invention, reference is now made to FIG. 4. In the embodiment of FIG. 4 the top mold plate 42 is formed so as to present at least two sprues 48 communicating with a single (each) mold cavity 50. One of the sprues 48 of each such pair communicates directly with a corresponding one of the apertures 20 formed in the insulation unit 18C. However, the other sprue 48 of each such pair communicates directly with a blind recess 58 formed in the underside 30 of the plate 22C of the insulation unit 18C. As a result, undesirable gases collected in the mold cavities 50 during the period of time in which elastomeric stock is injected into such cavities 50, and also during the period of time in which the elastomeric stock cures in the cavities 50, may be vented or exhausted through those vent-acting sprues 48 communicating with the blind recesses 58, respectively.

Preferably, the configuration of the sprues 48 which communicate with the blind recesses 58 and the sprues 48 which communicate with respective ones of the insulation unit apertures 20 have similar cross-sectional configurations of the type discussed above for the embodiment of the top mold plate 42 illustrated in FIG. 2. It will be appreciated, that the undesirable gases collected in the cavities 50 may be vented to the confines of the blind recesses 58 and, thus, not interfere with the formation of a properly cured elastomeric product in each of the cavities 50.

Referring now to FIG. 5, there is illustrated still another embodiment of the insulation unit of the present invention. In this embodiment 18D, and similarly in the form of the aforementioned first embodiment of the insulation unit 18 illustrated in FIG. 1, the thermal-insulatory plate 22D is provided with a reinforcing plate 26D superposed thereupon and separating it (the plate 22D) from the chamber 14 of the injection unit 10.

As is clear from FIGS. 1 and 5, the insulation unit 18D is preferably designed such that the reinforcing plate 26D has a projected area and configuration corresponding in size to and insertable into the open end of the chamber 14 of the injection unit 10. Moreover, the reinforcing plate 26D is sufficiently elastic and contoured such that when subjected to axial pressure it, the reinforcing plate 26D, undergoes a slight increase in peripheral expansion sufficient to seal any clearance between the internal wall of the chamber 14 and the periphery of the reinforcing plate 26D.

In this respect, as illustrated in FIG. 1, in the instance where the reinforcing plate 26 is simply in the form of a thin flat disc, the injection unit 10 is provided with an annular point-like lip 60 which is axially engagable with the circular marginal edge of the plate 26 to expand the periphery of the plate 26 at least slightly into contact with the inner wall of the chamber 14 and thereby provide an effective seal. However, in the form of the embodiment of the reinforcing plate 26D illustrated in FIG. 5, wherein such reinforcing plate 26D is provided with a generally upstanding annular flange 62, pressure exerted by the piston 12 against elastomeric stock confined in the chamber 14 is in turn transmitted axially to the reinforcing plate 26D, thereby at least slightly peripherally expanding the flange 62 of the reinforcing plate 26D into contact with the interior wall of the chamber 14. An effective seal is provided in this manner.

For purposes herein, it has been determined that it is preferable that the reinforcing plate 26, 26D etc. be constituted of a material which readily dissipates heat, for example, iron, steel as well as copper and/or steel alloyed with beryllium. Moreover, it is preferred that the reinforcing plate 26, 26D when constituted, for example, of stainless steel have a thickness of approximately 2 millimeters, and that the thermal-insulatory plate 22 have a thickness of approximately 10 millimeters. Still further, it is preferred, whatever material is chosen for the reinforcing plate 26, 26D, that such material have a tensile strength of at least 30 kg./mm.$^2$, and a thermal conductivity of at least 15 watts/m.° C., and preferably 150 watts/m.° C.

Accordingly, the reinforcing plate 26, 26D is so constituted and designed that it does not interfere with the desired flexibility necessary for the insulation unit 18, 18D to function effectively. Moreover, because of the provision of the reinforcing plate 26, 26D, which isolates or separates the thermal-insulatory plate 22, 22D from the elastomeric stock confined in the chamber 14, when the piston 12 (and the stock adhering to the piston 12 and unit 18, 18D) is retracted away from the region of the insulation unit 18, 18D, such as for purposes of replenishing the chamber 14 with additional elastomeric stock, the plate 22, 22D is reinforced against the buckling, cracking and otherwise deteriorating in the vicinity of its apertures.

In the absence of reinforcing the plate 22, 22D, after a period of time in which the plate 22, 22D is subjected to buckling caused by an adhesive pull thereagainst generated by the elastomeric stock upon piston-retraction, the unreinforced plate 22, 22D would undergo excessive strain and crack in the vicinity of its sprue-communicating apertures. The provision of the reinforcing plate 26, 26D of the present invention, however, obviates the latter problem.

It will be understood that the foregoing description of the preferred embodiments of the present invention is for purposes of illustration only and that the various structural and operational features and relationships herein disclosed are susceptible to a number of modifications and changes none of which entails any departure from the spirit and scope of the present invention as defined in the hereto appended claims.

What is claimed is:

1. An apertured insulation unit for interposition between a mold having at least one cavity in which elastomeric stock can be cured in the form of said cavity and an open ended chamber of an injection unit from which elastomeric stock can be expelled and transferred through said insulation unit to the cavity of said mold, said mold and injection unit being movable axially relative to one another into and out of pressing association with respective opposite side-faces of said insulation unit, said insulation unit serving to prevent curing of elastomeric stock remaining in said injection unit with the curing of a portion of said stock transferred to said cavity without separation of said mold or injection unit from said insulation unit, said insulation unit comprising a first plate constituted of a flexible thermal-insulatory material, and a second plate superposed upon and affixed to said first plate, at least said second plate having a projected area and configuration corresponding in size to and insertable into the open end of said chamber of said injection unit, said second plate being constituted of a different flexible material having a greater tensile strength and a lower capacity to resist heat-transfer than said first plate, said first and second plates each being multi-apertured and arranged such that each aperture in said first plate has a corresponding coaxially aligned aperture in said second plate and elastomeric stock is transferable through each aligned pair of such apertures, said second plate constituting means for reinforcing said first plate against buckling and deterioration in the vicinity of the coaxially aligned apertures of said plates.

2. An insulation unit as claimed in claim 1, wherein said second plate is sufficiently elastic and contoured such that when subjected to axial pressure it undergoes a slight increase in peripheral expansion sufficient to seal any clearance between the internal wall of said injection unit which defines said chamber and the periphery of said second plate.

3. An insulation unit as claimed in claim 2, wherein said second plate includes a flange extending along its periphery in a direction away from the surface thereof which is affixed to said first plate.

4. An insulation unit as claimed in claim 1 wherein said second plate is metallic, and said first plate is constituted of a mixture of a synthetic resin and asbestos fibers.

5. An insulation unit as claimed in claim 4, wherein said second plate has a tensile strength of at least 30 kg./mm.$^2$ and a thermal conductivity of at least 15 watts/m.° C.

6. An insulation unit as claimed in claim 4, wherein said first plate is constituted of a phenolic resin having a thermal conductivity of approximately 0.5 watts/m.° C.

7. An insulation unit as claimed in claim 4, wherein said first plate has a thickness of approximately 10 mm., and said second plate has a thickness of approximately 2 mm.

8. An apertured insulation unit having opposite side-faces and adapted for interposition between (A) a mold having at least one cavity in which elastomeric stock can be cured in the form of said cavity and (B) an open ended chamber of an injection unit from which elastomeric stock can be expelled and transferred through said insulation unit to the cavity of said mold, with said mold and said injection unit being arranged for relative axial movement therebetween into and out of confining relation to said insulation unit at the respective opposite side-faces of the latter so as to enable the elastomeric stock in said chamber to be pressed against said insulation unit, and said insulation unit when so confined serving, without separation of said mold or said injection unit from said insulation unit, to prevent the curing of the elastomeric stock remaining in said injection unit with the curing of the portion of said stock transferred to said cavity;

said insulation unit comprising a first plate having first and second faces and constituted of a thermal-insulatory material, and a second plate having first and second faces and constituted of a different material having a greater tensile strength and a lower capacity to resist heat-transfer than said first plate, said second plate being arranged to be interposed between said injection unit and said first plate with said first faces of said first and second plates directed toward each other, said second face of said first plate defining the one of said side-faces of said insulation unit to be directed toward said mold, said second face of said second plate defining the one of said side-faces of said insulation unit to be directed toward said injection unit, and said first and second plates each having at least one aperture, with each said aperture in each plate being aligned with a corresponding aperture in the other plate, through which elastomeric stock is transferable, said second plate constituting means for preventing the elastomeric stock in said injection unit from coming into adhering engagement with said first face of said first plate.

9. An insulation unit as claimed in claim 8, wherein said first and second plates are each multi-apertured and arranged such that each aperture in said first plate has a corresponding coaxially aligned aperture in said second plate.

10. An insulation unit as claimed in claim 8, wherein both said first plate and said second plate are flexible, with the flexibility of said second plate being greater than that of said first plate to a degree sufficient to ensure that when said plates are in contact with each other said second plate does not to adversely affect the overall flexibility of said insulation unit.

11. An insulation unit as claimed in claim 8, wherein at least said second plate has a projected area and configuration corresponding in size to and insertable into the open end of said chamber of said injection unit.

12. An insulation unit as claimed in claim 11, wherein said second plate is sufficiently elastic and contoured such that when subjected to axial pressure it undergoes a slight increase in peripheral expansion sufficient to seal any clearance between the internal wall of said injection unit which defines said chamber and the periphery of said second plate.

13. An insulation unit as claimed in claim 12, wherein said second plate includes a flange extending along its periphery in a direction away from said first plate.

14. An insulation unit as claimed in claim 8, wherein said second plate is metallic, and said first plate is constituted of a mixture of a synthetic resin and asbestos fibers.

15. An insulation unit as claimed in claim 14, wherein said second plate has a tensile strength of at least 30 kg./mm.$^2$ and a thermal conductivity of at least 15 watts/m.°C.

16. An insulation unit as claimed in claim 14, wherein said first plate is constituted of a phenolic resin having a thermal conductivity of approximately 0.5 watts/m.°C.

17. An insulation unit as claimed in claim 14, wherein said first plate has a thickness of approximately 10 mm., and said second plate has a thickness of approximately 2 mm.

18. An insulation unit as claimed in claim 8, wherein said aperture of said first plate is at least partially tapered and presents a divergent portion having a maximum diameter at said second face of said first plate.

19. An insulation unit as claimed in claim 18, wherein said aperture of said second plate is at least partially tapered and presents a maximum diameter at said second face of said second plate.

20. In combination, a mold having at least one cavity in which elastomeric stock can be cured in the form of said cavity, and an apertured insulation unit interposable between said mold and an injection unit from which elastomeric stock can be expelled and transferred through said insulation unit to the cavity of said mold, said mold and injection unit being movable axially relative to one another into and out of pressing association with respective opposite side-faces of said insulation unit, said insulation unit serving to prevent curing of elastomeric stock remaining in said injection unit with the curing of a portion of said stock transferred to said cavity without separation of said mold or injection unit from said insulation unit, said mold including a top plate having a sprue-constituting aperture communicating with said mold cavity, and said insulation unit including a plate constituted of thermal-insulatory material having an aperture communicating with said sprue-constituting aperture; wherein the improvement comprises vent means formed at least in part in said top plate and communicating with said mold cavity for directing the outflow of gas collected in said cavity during filling of the latter with and the curing therein of elastomeric stock, and said vent means comprises a second aperture formed in said top plate, and a blind recess formed in said insulation plate and communicating via an open end thereof with said second aperture.

21. The combination as claimed in claim 20, wherein said second aperture and said sprue-constituting aperture of said top plate have identical sizes and configurations.

22. The combination as claimed in claim 21, wherein said sprue-constituting aperture and said second aperture each is at least partially tapered and presents a divergent portion having a maximum diameter at the surface thereof which presses against said insulation plate.

23. The combination as claimed in claim 22, wherein said aperture of said insulation plate is at least partially tapered and presents a divergent portion having a maximum diameter at the side-face thereof against which presses said top plate.

24. An insulation unit as claimed in claim 1, wherein said aperture of said first plate is at least partially tapered and presents a divergent portion having a maximum diameter at a side-face of said first plate with which is engageable said mold.

25. An insulation unit as claimed in claim 24, wherein said aperture of said second plate is at least partially tapered and presents a maximum diameter at the side-face of said second plate opposite the one in contact with said first plate.

* * * * *

UNITED STATES PATENT AND TRADEMARK OFFICE
CERTIFICATE OF CORRECTION

PATENT NO. : 4,222,732
DATED : September 16, 1980
INVENTOR(S) : LAMBERT M. PASCH ET AL.

It is certified that error appears in the above-identified patent and that said Letters Patent are hereby corrected as shown below:

Column 8, line 65, for "does not to" read --does not act to--.

Signed and Sealed this

Sixteenth Day of December 1980

[SEAL]

Attest:

SIDNEY A. DIAMOND

Attesting Officer

Commissioner of Patents and Trademarks